US012755679B2

(12) United States Patent
Pyun et al.

(10) Patent No.: US 12,755,679 B2
(45) Date of Patent: Oct. 6, 2026

(54) DISPLAY DEVICE AND ELECTRONIC DEVICE INCLUDING THE DISPLAY DEVICE

(71) Applicant: Samsung Display Co., Ltd., Yongin-si (KR)

(72) Inventors: Kihyun Pyun, Yongin-si (KR); Jungeon An, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/210,635

(22) Filed: May 16, 2025

(65) Prior Publication Data

US 2026/0031023 A1 Jan. 29, 2026

(30) Foreign Application Priority Data

Jul. 29, 2024 (KR) ........................ 10-2024-0100514

(51) Int. Cl.
*G09G 3/32* (2016.01)

(52) U.S. Cl.
CPC ....... *G09G 3/32* (2013.01); *G09G 2310/0275* (2013.01); *G09G 2310/08* (2013.01); *G09G 2320/0233* (2013.01); *G09G 2320/0271* (2013.01)

(58) Field of Classification Search
CPC .................. G09G 3/32; G09G 3/3233; G09G 2310/0275; G09G 2310/08; G09G 2320/0233; G09G 2320/0271
See application file for complete search history.

(56) References Cited

U.S. PATENT DOCUMENTS

2021/0264838 A1* 8/2021 Park .................... G09G 3/2003

FOREIGN PATENT DOCUMENTS

| | | |
|---|---|---|
| KR | 10-0329465 B1 | 3/2002 |
| KR | 10-0806907 B1 | 2/2008 |
| KR | 10-0965822 B1 | 6/2010 |
| KR | 10-2660588 B1 | 4/2024 |

* cited by examiner

*Primary Examiner* — Yaron Cohen
(74) *Attorney, Agent, or Firm* — Womble Bond Dickinson (US) LLP

(57) ABSTRACT

A display device includes: a display panel including a plurality of pixels; a driving controller configured to generate output image data based on input image data; and a data driver configured to generate a data voltage based on the output image data, wherein the driving controller is configured to: determine a low grayscale range in which a minimum grayscale is a first reference grayscale and a maximum grayscale is a second reference grayscale based on a driving frequency; and determine an output ratio and an output order of first reference output image data corresponding to the first reference grayscale and second reference output image data corresponding to the second reference grayscale.

20 Claims, 12 Drawing Sheets

DISPLAY DEVICE AND ELECTRONIC DEVICE INCLUDING THE DISPLAY DEVICE

CROSS-REFERENCE TO RELATED APPLICATION

The present application claims priority to and the benefit of Korean Patent Application No. 10-2024-0100514, filed on Jul. 29, 2024, in the Korean Intellectual Property Office, the entire disclosure of which is incorporated herein by reference.

BACKGROUND

1. Field

Aspects of some embodiments of the present disclosure relate to a display device.

2. Description of the Related Art

Generally, a display device includes a display panel and a display panel driver. The display panel includes a plurality of gate lines, a plurality of data lines and a plurality of pixels. The display panel driver includes a gate driver providing a gate signal to the gate lines, a data driver providing a data voltage to the data lines and a driving controller controlling the gate driver and the data driver.

The pixels may include a data transmission transistor transmitting the data voltage, a storage capacitor storing the data voltage and a driving transistor generating a driving current according to a voltage charged to the storage capacitor. As a resolution of the display device and a driving frequency of the display device increase, a charging time for charging the data voltage to the pixels may decrease. When the charging time decreases, a charging ratio of the data voltage may decrease. When the charging ratio decreases, the pixels may not emit a light at a grayscale corresponding to the data voltage. Accordingly, when the charging ratio decreases in a high resolution driving mode or a high frequency driving mode, a mura may be visible in the display panel. That is, a display quality of the display device may be deteriorated.

The above information disclosed in this Background section is only for enhancement of understanding of the background and therefore the information discussed in this Background section does not necessarily constitute prior art.

SUMMARY

Aspects of some embodiments of the present disclosure relate to a display device. For example, aspects of some embodiments of the present disclosure relate to the display device having relatively improved display quality and an electronic device including the display device.

Aspects of some embodiments of the present disclosure include a display device having relatively improved display quality.

Aspects of some embodiments of the present disclosure include an electronic device including the display device.

In a display device according to some embodiments of the present disclosure, the display device includes a display panel including a plurality of pixels, a driving controller configured to generate output image data based on input image data, and a data driver configured to generate a data voltage based on the output image data. According to some embodiments, the driving controller is configured to determine a low grayscale range in which a minimum grayscale is a first reference grayscale and a maximum grayscale is a second reference grayscale based on a driving frequency, and determine an output ratio and an output order of first reference output image data corresponding to the first reference grayscale and second reference output image data corresponding to the second reference grayscale.

According to some embodiments, the first reference grayscale may be configured to be changed based on the driving frequency being changed.

According to some embodiments, the first reference grayscale maybe configured to increase based on the driving frequency increasing.

According to some embodiments, the second reference grayscale may be configured to be changed based on the driving frequency being changed.

According to some embodiments, the second reference grayscale may be configured to decrease based on the driving frequency increasing.

According to some embodiments, the first reference grayscale may be configured to be changed and the second reference grayscale may be configured to be changed based on the driving frequency being changed.

According to some embodiments, the first reference grayscale may be configured to increase and the second reference grayscale may be configured to decrease based on the driving frequency increasing.

According to some embodiments, the driving controller may be configured to determine a charging time at which the data voltage is charged to the pixels based on the driving frequency, and determine a charging ratio at which the data voltage is charged to the pixels based on the charging time.

According to some embodiments, the first reference grayscale may be configured to decrease and the second reference grayscale may be configured to increase based on the charging ratio increasing.

In a display device according to some embodiments of the present disclosure, the display device includes a display panel including a plurality of pixels, a driving controller configured to generate output image data based on input image data, and a data driver configured to generate a data voltage based on the output image data. According to some embodiments, the driving controller includes a driving frequency determiner configured to determine a driving frequency of the display panel, a low grayscale range determiner configured to determine a first reference grayscale based on the driving frequency, determine a second reference grayscale based on the driving frequency and determine a low grayscale range in which a minimum grayscale is the first reference grayscale and a maximum grayscale is the second reference grayscale, and an output ratio determiner configured to determine an output ratio and an output order of first reference output image data corresponding to the first reference grayscale and second reference output image data corresponding to the second reference grayscale.

According to some embodiments, the low grayscale range determiner may include a first reference grayscale determiner configured to change the first reference grayscale based on the driving frequency being changed.

According to some embodiments, the first reference grayscale may be configured to increase based on the driving frequency increasing.

According to some embodiments, the low grayscale range determiner may include a second reference grayscale determiner configured to change the second reference grayscale based on the driving frequency being changed.

According to some embodiments, the second reference grayscale may be configured to decrease based on the driving frequency increasing.

According to some embodiments, the low grayscale range determiner may include a first reference grayscale determiner configured to change the first reference grayscale based on the driving frequency being changed, and a second reference grayscale determiner configured to change the second reference grayscale based on the driving frequency being changed.

According to some embodiments, the first reference grayscale may be configured to increase and the second reference grayscale may be configured to decrease based on the driving frequency increasing.

According to some embodiments, the low grayscale range determiner may include a charging ratio determiner configured to determine a charging ratio at which the data voltage is charged to the pixels. According to some embodiments, the charging ratio determiner may be configured to determine a charging time at which the data voltage is charged to the pixels based on the driving frequency and determine the charging ratio based on the charging time.

According to some embodiments, the first reference grayscale may be configured to decrease and the second reference grayscale may be configured to increase based on the charging ratio increasing.

In an electronic device according to some embodiments of the present disclosure, the electronic device includes a processor configured to output input image data, a memory device configured to store data required for an operation of the processor, a display panel including a plurality of pixels, a driving controller configured to generate output image data based on the input image data, and a data driver configured to generate a data voltage based on the output image data. According to some embodiments, the driving controller is configured to determine a low grayscale range in which a minimum grayscale is a first reference grayscale and a maximum grayscale is a second reference grayscale based on a driving frequency, and determine an output ratio and an output order of first reference output image data corresponding to the first reference grayscale and second reference output image data corresponding to the second reference grayscale.

According to some embodiments, the first reference grayscale may be configured to be changed and the second reference grayscale may be configured to be changed based on the driving frequency being changed.

In the display device and the electronic device according to some embodiments of the present disclosure, the charging ratio of the pixels included in the display panel may relatively increase.

For example, in the low grayscale range, the display device may operate in a digital driving mode. Grayscales of the low grayscale range may be displayed by only the first reference grayscale and the second reference grayscale in the digital driving mode. At this time, as the first reference grayscale and the second reference grayscale are changed for displaying the grayscales of the low grayscale range according to the driving frequency of the display device, a range of the low grayscale range may be changed. When the range of the low grayscale range decreases, a swing width of the data voltage transmitted to the pixels may decrease. When the swing width decreases, the data voltage corresponding to the second reference grayscale may be exactly stored in the pixels during a same time. That is, the charging ratio of the pixels may relatively increase. When the charging ratio increases, the pixels may emit a light at the grayscale corresponding to the data voltage. Accordingly, a mura may not be visible in the display panel of the display device. That is, the display quality of the display device may be relatively improved.

BRIEF DESCRIPTION OF THE DRAWINGS

The above and other features and characteristics of embodiments according to the present disclosure will become more apparent by describing in more detail aspects of some embodiments thereof with reference to the accompanying drawings, in which.

DETAILED DESCRIPTION

Figure 1:
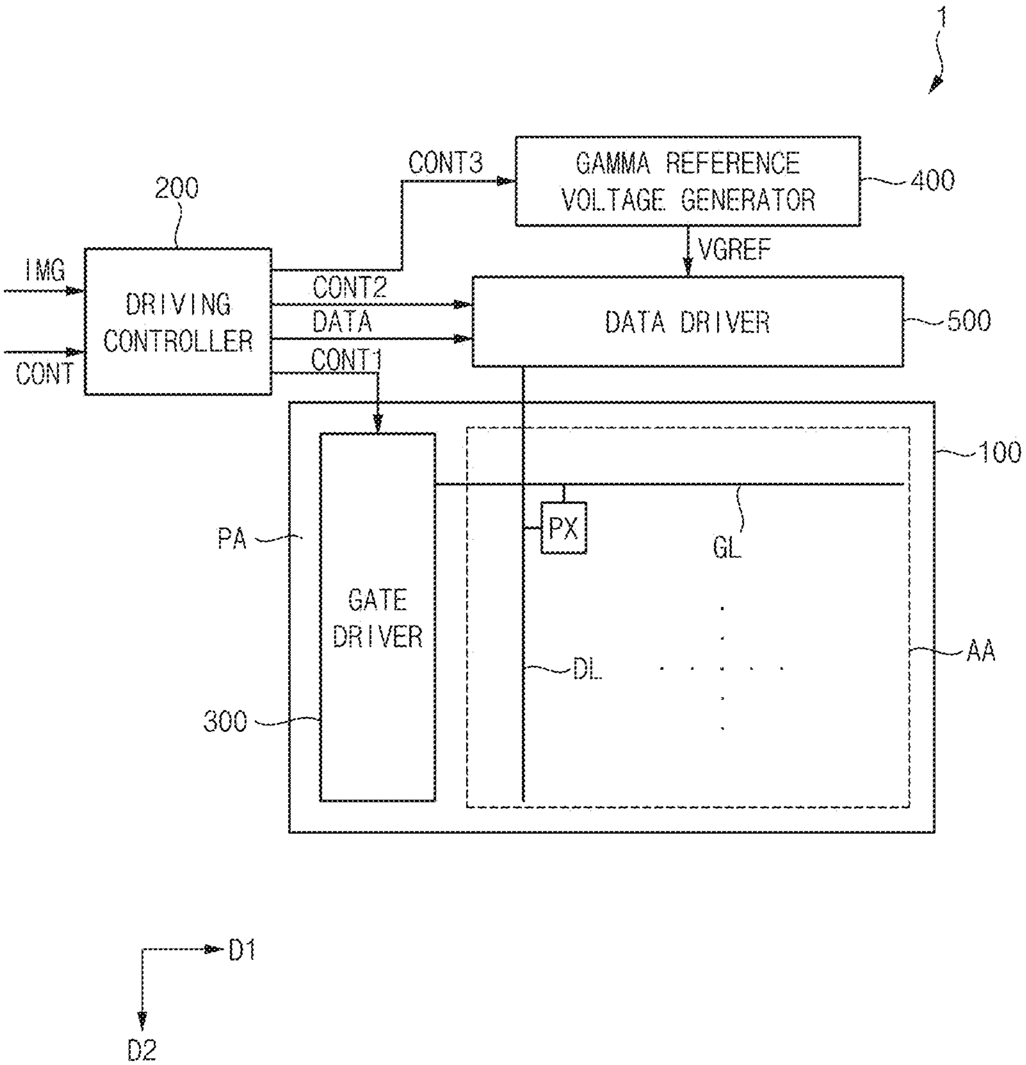
FIG. 1 is a block diagram illustrating a display device according to some embodiments of the present disclosure.

Hereinafter, display devices according to some embodiments will be described in more detail with reference to the accompanying drawings. The same reference numerals are used for the same components in the drawings, and redundant descriptions of the same components will be omitted.

FIG. 1 is a block diagram illustrating a display device 1 according to some embodiments of the present disclosure.

Referring to FIG. 1, the display device 1 includes a display panel 100 and a display panel driver. The display panel driver includes a driving controller 200, a gate driver 300, a gamma reference voltage generator 400 and a data driver 500.

For example, the driving controller 200 and the data driver 500 may be integrally formed. For example, the driving controller 200, the gamma reference voltage generator 400, and the data driver 500 may be integrally formed. A driving module including at least the driving controller 200 and the data driver 500 which are integrally formed may be referred to as a timing controller embedded data driver (TED).

The display panel 100 has a display region AA at which images are displayed and a peripheral region PA adjacent to the display region AA.

The display panel 100 includes gate lines GL, data lines DL and pixels PX electrically connected to the gate lines GL and the data lines DL. The gate lines GL extend in a first direction D1 and the data lines DL extend in a second direction D2 crossing the first direction D1. Although FIG. 1 illustrates a single pixel PX, a single gate line GL, and a single data line DL for convenience of illustrate, embodiments according to the present disclosure are not limited thereto, and as a person having ordinary skill in the art would appreciate, the display panel 100 may include any number of pixels PX, gate lines GL, and data lines DL according to the design and size of the display panel 100.

The driving controller 200 receives input image data IMG and an input control signal CONT from an external device. For example, the input image data IMG may include red image data, green image data and blue image data. According to some embodiments, the input image data IMG may further include white image data. According to some embodiments, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 is described with reference to FIG. 4 to FIG. 8 in detail.

The gate driver 300 generates gate signals driving the gate lines GL in response to the first control signal CONT1 received from the driving controller 200. The gate driver 300 may output the gate signals to the gate lines GL. For example, the gate driver 300 may sequentially output the gate signals to the gate lines GL. For example, the gate driver 300 may be integrated on the peripheral region PA of the display panel 100. For example, the gate driver 300 may be mounted on the peripheral region PA of the display panel 100.

The gamma reference voltage generator 400 generates a gamma reference voltage VGREF in response to the third control signal CONT3 received from the driving controller 200. The gamma reference voltage generator 400 provide the gamma reference voltage VGREF to the data driver 500. The gamma reference voltage VGREF has a value corresponding to the data signal DATA.

According to some embodiments, the gamma reference voltage generator 400 may be located or formed in (e.g., as part of the same component) the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into a data voltage having an analog type using the gamma reference voltage VGREF. The data driver 500 outputs the data voltage to the data lines DL. For example, the data driver 500 may be integrated on the peripheral region PA of the display panel 100. For example, the data driver 500 may be mounted on the peripheral region PA of the display panel 100.

Figure 2:
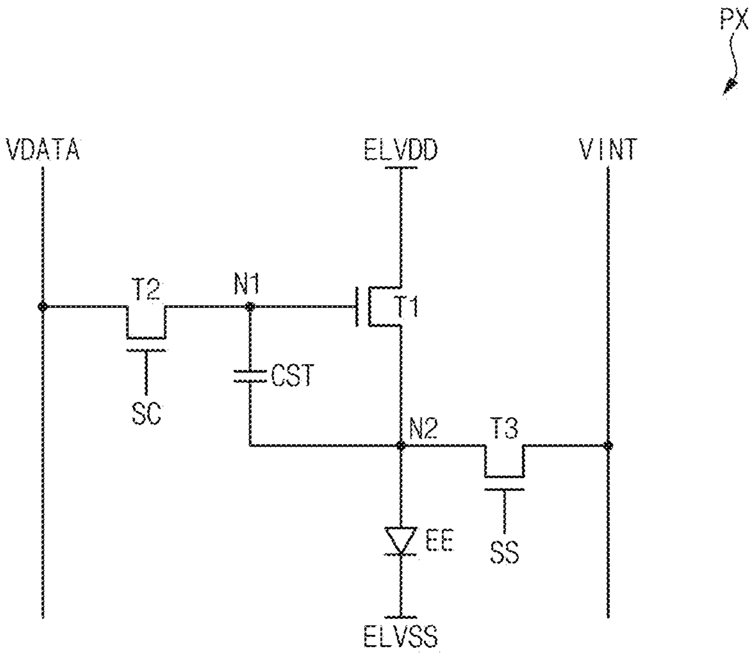
FIG. 2 is a circuit diagram illustrating a pixel of FIG. 1.

FIG. 2 is a circuit diagram illustrating a pixel PX of FIG. 1. Although FIG. 2 illustrates various components in a pixel according to some embodiments, embodiments according to the present disclosure are not limited thereto, and according to various embodiments, a pixel may include additional components or fewer components without departing from the spirit and scope of embodiments according to the present disclosure.

Referring to FIGS. 1 and 2, the pixel PX may include a first switching element T1, a second switching element T2 and a light emitting element EE. For example, the pixel PX may further include a storage capacitor CST and a third switching element T3.

The first switching element T1 may include a control electrode connected to a first node N1, a first electrode receiving a first power supply voltage ELVDD and a second electrode connected to a second node N2.

The second switching element T2 may include a control electrode receiving a first gate signal SC, a first electrode receiving the data voltage VDATA and a second electrode connected to the first node N1.

The light emitting element EE may include a first electrode connected to the second node N2 and a second electrode receiving a second power supply voltage ELVSS. A voltage level of the second power supply voltage ELVSS may be lower than a voltage level of the first power supply voltage ELVDD.

The storage capacitor CST may include a first electrode connected to the first node N1 and a second electrode connected to the second node N2.

The third switching element T3 may include a control electrode receiving a second gate signal SS, a first electrode receiving an initialization voltage VINT and a second electrode connected to the second node N2.

For example, the first switching element T1, the second switching element T2 and the third switching element T3 may be N-type transistors. For example, the first switching element T1, the second switching element T2 and the third switching element T3 may be oxide semiconductor transistors.

For example, the control electrode of each of the first switching element T1, the second switching element T2 and the third switching element T3 may be a gate electrode. For example, the first electrode of each of the first switching element T1, the second switching element T2 and the third switching element T3 may be a source electrode or a drain electrode. For example, the second electrode of each of the first switching element T1, the second switching element T2 and the third switching element T3 may be the source electrode or the drain electrode.

Although the pixel PX is described as including the first switching element T1, the second switching element T2, the third switching element T3, the storage capacitor CST and the light emitting element EE, the embodiments according to the present disclosure are not limited thereto.

Figure 3A:
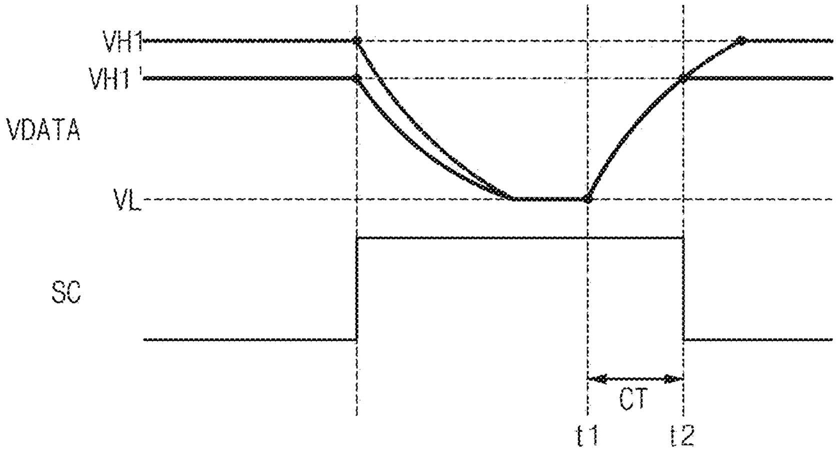
FIG. 3A is a timing diagram illustrating data voltages stored in a storage capacitor of FIG. 2 during a charging time and corresponding to a first grayscale and a third grayscale.
Figure 3B:
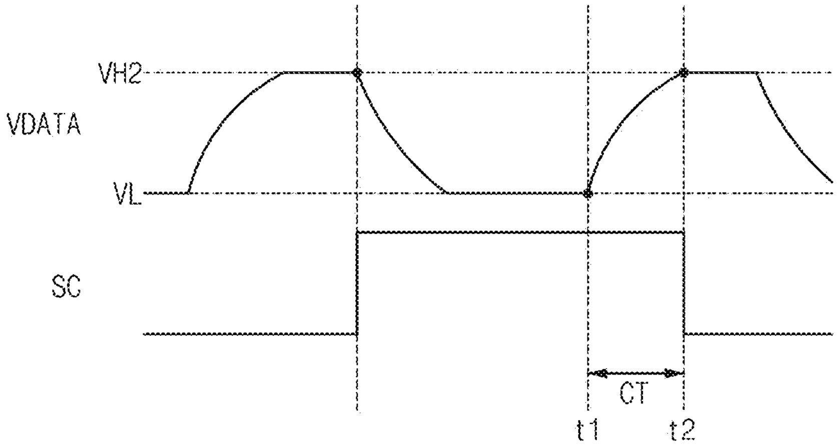
FIG. 3B is a timing diagram illustrating data voltages stored in the storage capacitor of FIG. 2 during the charging time and corresponding to the first grayscale and a second grayscale.

FIG. 3A is a timing diagram illustrating data voltages VDATA stored in the storage capacitor CST of FIG. 2 during a charging time CT and corresponding to a first grayscale and a third grayscale. FIG. 3B is a timing diagram illustrating data voltages VDATA stored in the storage capacitor CST of FIG. 2 during the charging time CT and corresponding to the first grayscale and a second grayscale.

Referring to FIGS. 1 to 3A, the pixel PX may store a first grayscale voltage VL in the storage capacitor CST to emit a light at the first grayscale. The pixel PX may store a third grayscale voltage VH1 in the storage capacitor CST to emit a light at the third grayscale which is higher than the first grayscale.

According to some embodiments, the pixel PX may alternately emit a light at the first grayscale and the third grayscale. When a difference between the first grayscale voltage VL and the third grayscale voltage VH1 is great, the data voltage VDATA may not be sufficiently stored in the storage capacitor CST during the charging time CT. For example, the data voltage VDATA may be stored in the storage capacitor CST only up to a middle grayscale voltage VH1'. In this case, the pixel PX may not emit a light at the third grayscale.

Referring to FIGS. 1 to 3B, the pixel PX may store the first grayscale voltage VL in the storage capacitor CST to emit a light at the first grayscale. The pixel PX may store a second grayscale voltage VH2 in the storage capacitor CST to emit a light at the second grayscale which is higher than the first grayscale and lower than the third grayscale.

According to some embodiments, the pixel PX may alternately emit a light at the first grayscale and the second grayscale. When a difference between the first grayscale voltage VL and the second grayscale voltage VH2 is small, the data voltage VDATA may be sufficiently stored in the storage capacitor CST during the charging time CT. For example, the data voltage VDATA may be stored in the storage capacitor CST up to the second grayscale voltage VH2. In this case, the pixel PX may exactly emit a light at the second grayscale.

When the charging time CT is same, the charging ratio of the storage capacitor CST may increase as a difference between the data voltages VDATA decreases. When the charging ratio increases, the pixel PX may exactly emit a light at a target grayscale.

Figure 4:
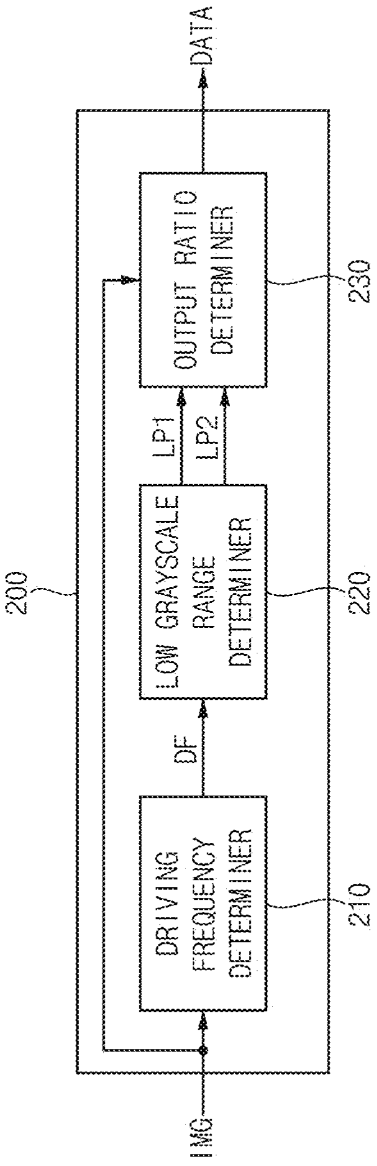
FIG. 4 is a block diagram illustrating a driving controller of FIG. 1.
Figure 5:
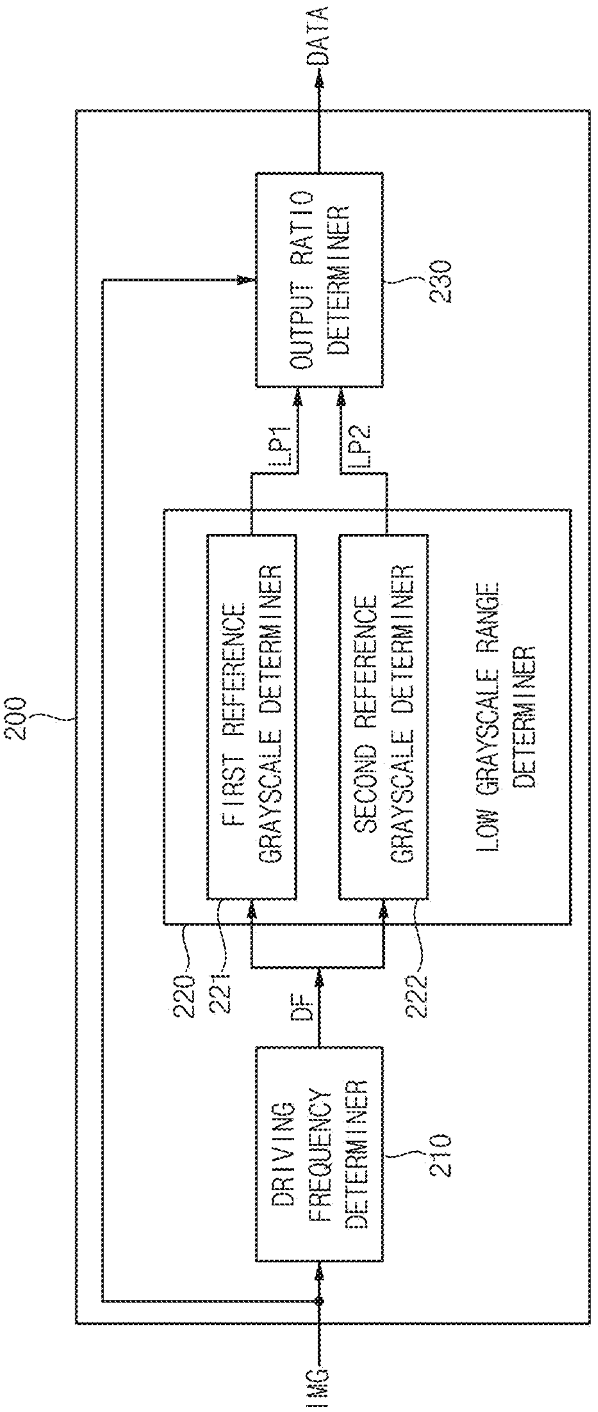
FIG. 5 is a block diagram illustrating a low grayscale range determiner of the driving controller of FIG. 4.

FIG. 4 is a block diagram illustrating the driving controller 200 of FIG. 1. FIG. 5 is a block diagram illustrating a low grayscale range determiner (or a low grayscale range determination circuit) 220 of the driving controller 200 of FIG. 4.

Referring to FIGS. 1 to 5, the driving controller 200 may include a driving frequency determiner (or a driving frequency determination circuit) 210, a low grayscale range determiner 220 and an output ratio determiner (or an output ratio determination circuit) 230. The driving frequency determiner 210 may determine a driving frequency DF of the display panel 100. The low grayscale range determiner 220 may determine a low grayscale range in which a minimum grayscale is a first reference grayscale LP1 and a maximum grayscale is a second reference grayscale LP2 based on the driving frequency DF. The output ratio determiner 230 may determine an output ratio and an output order of first reference output image data corresponding to the first reference grayscale LP1 and second reference output image data corresponding to the second reference grayscale LP2.

The driving frequency determiner 210 may receive the input image data IMG. The driving frequency determiner 210 may determine the driving frequency DF based on the input image data IMG. The driving frequency determiner 210 may transmit an information for the driving frequency DF to the low grayscale range determiner 220.

The low grayscale range determiner 220 may determine the low grayscale range in which the minimum grayscale is the first reference grayscale LP1 and the maximum grayscale is the second reference grayscale LP2 based on the driving frequency DF.

According to some embodiments, the low grayscale range determiner 220 may include a first reference grayscale determiner (or a first reference grayscale determination circuit) 221 for determining the first reference grayscale LP1 and a second reference grayscale determiner (or a second reference grayscale determination circuit) 222 for determining the second reference grayscale LP2.

For example, the first reference grayscale determiner 221 may determine the first reference grayscale LP1 corresponding to the driving frequency DF based on a first look-up table. For example, the second reference grayscale determiner 222 may determine the second reference grayscale LP2 corresponding to the driving frequency DF based on a second look-up table.

The first reference grayscale LP1 and/or the second reference grayscale LP2 may be changed according to the driving frequency DF. For example, when the driving frequency DF increases, the first reference grayscale LP1 may increase and the second reference grayscale LP2 may be a constant value. For example, when the driving frequency DF increases, the second reference grayscale LP2 may decrease and the first reference grayscale LP1 may be a constant value. For example, when the driving frequency DF increases, the first reference grayscale LP1 may increase and the second reference grayscale LP2 may decrease.

The output ratio determiner 230 may determine the output ratio and the output order of the first reference output image data corresponding to the first reference grayscale LP1 and the second reference output image data corresponding to the second reference grayscale LP2.

According to some embodiments, the first reference grayscale LP1 of the low grayscale range may be a grayscale value of 0 and the second reference grayscale LP2 of the low grayscale range may be a grayscale value of 32. The output ratio determiner 230 may output the first reference output image data corresponding to the grayscale value of 0 at a ratio of 25% to display a grayscale value of 24 included in the low grayscale range. In addition, the output ratio determiner 230 may output the second reference output image data corresponding to the grayscale value of 32 at a ratio of 75% to display the grayscale value of 24 included in the low grayscale range.

In addition, the output ratio determiner 230 may change the output order of the first reference output image data and the second reference output image data in each frame to prevent or reduce a mura being recognized. For example, a first pixel among the first pixel, a second pixel, a third pixel and a fourth pixel may emit a light at the grayscale value of 0 in an N-th frame, herein N is a positive integer. In addition, the second pixel, the third pixel and the fourth pixel may emit a light at the grayscale value of 32 in the N-th frame. The second pixel among the first pixel, the second pixel, the third pixel and the fourth pixel may emit a light at the grayscale value of 0 in an (N+1)-th frame. In addition, the first pixel, the third pixel and the fourth pixel may emit a light at the grayscale value of 32 in the (N+1)-th frame. The third pixel among the first pixel, the second pixel, the third pixel and the fourth pixel may emit a light at the grayscale value of 0 in an (N+2)-th frame. In addition, the first pixel, the second pixel and the fourth pixel may emit a light at the grayscale value of 32 in the (N+2)-th frame. The fourth pixel among the first pixel, the second pixel, the third pixel and the fourth pixel may emit a light at the grayscale value of 0 in an (N+3)-th frame. In addition, the first pixel, the second pixel and the third pixel may emit a light at the grayscale value of 32 in the (N+3)-th frame.

According to some embodiments, the first reference grayscale LP1 of the low grayscale range may be the grayscale value of 0 and the second reference grayscale LP2 of the low grayscale range may be the grayscale value of 32. The output ratio determiner 230 may output the first reference output image data corresponding to the grayscale value of 0 at a ratio of 50% to display a grayscale value of 16 included in the low grayscale range. In addition, the output ratio determiner 230 may output the second reference output image data corresponding to the grayscale value of 32 at a ratio of 50% to display the grayscale value of 16 included in the low grayscale range.

In addition, the output ratio determiner 230 may change the output order of the first reference output image data and the second reference output image data in each frame to prevent or reduce the mura being recognized. For example, the first pixel among the first pixel and the second pixel may emit a light at the grayscale value of 0 in an N-th frame, herein N is a positive integer. In addition, the second pixel may emit a light at the grayscale value of 32 in the N-th frame. The second pixel among the first pixel and the second pixel may emit a light at the grayscale value of 0 in an (N+1)-th frame. In addition, the first pixel may emit a light at the grayscale value of 32 in the (N+1)-th frame.

In the low grayscale range, when the driving frequency increases, the charging ratio of the storage capacitor CST may increase as the low grayscale range determiner 220 increases the first reference grayscale LP1 and decreases the second reference grayscale LP2. Accordingly, the first reference grayscale LP1 and the second reference grayscale LP2 may be exactly displayed in the display panel 100. In addition, the mura may not be visible in the low grayscale range. That is, a quality of the display device 1 may be relatively improved.

Figure 6:
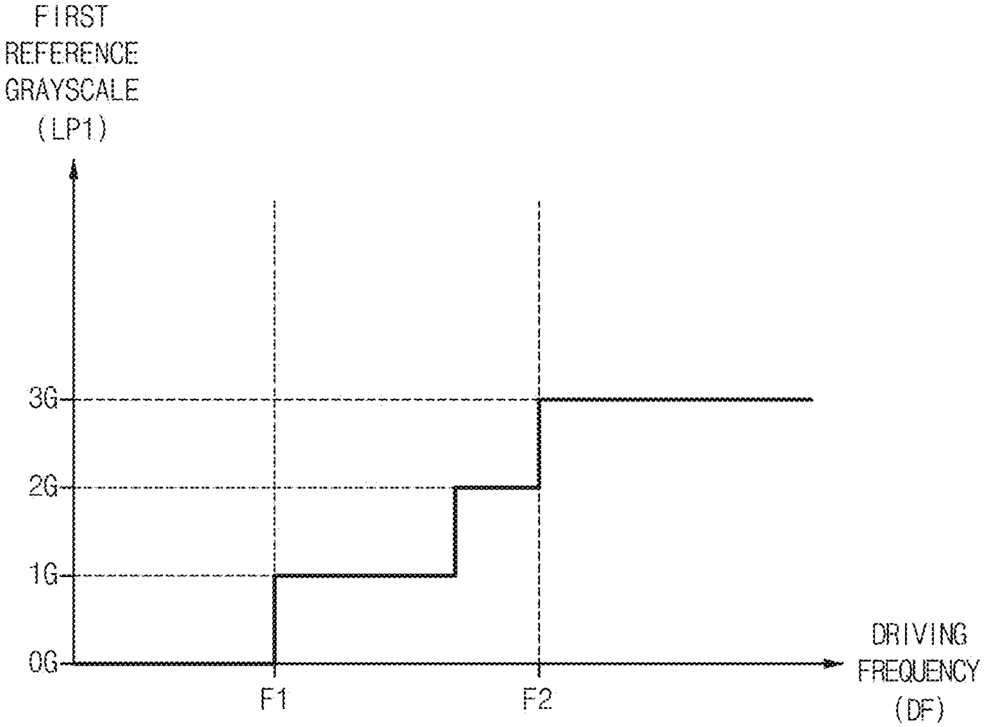
FIG. 6 is a graph illustrating a relationship between a driving frequency of a display panel of FIG. 1 and a first reference grayscale.
Figure 7:
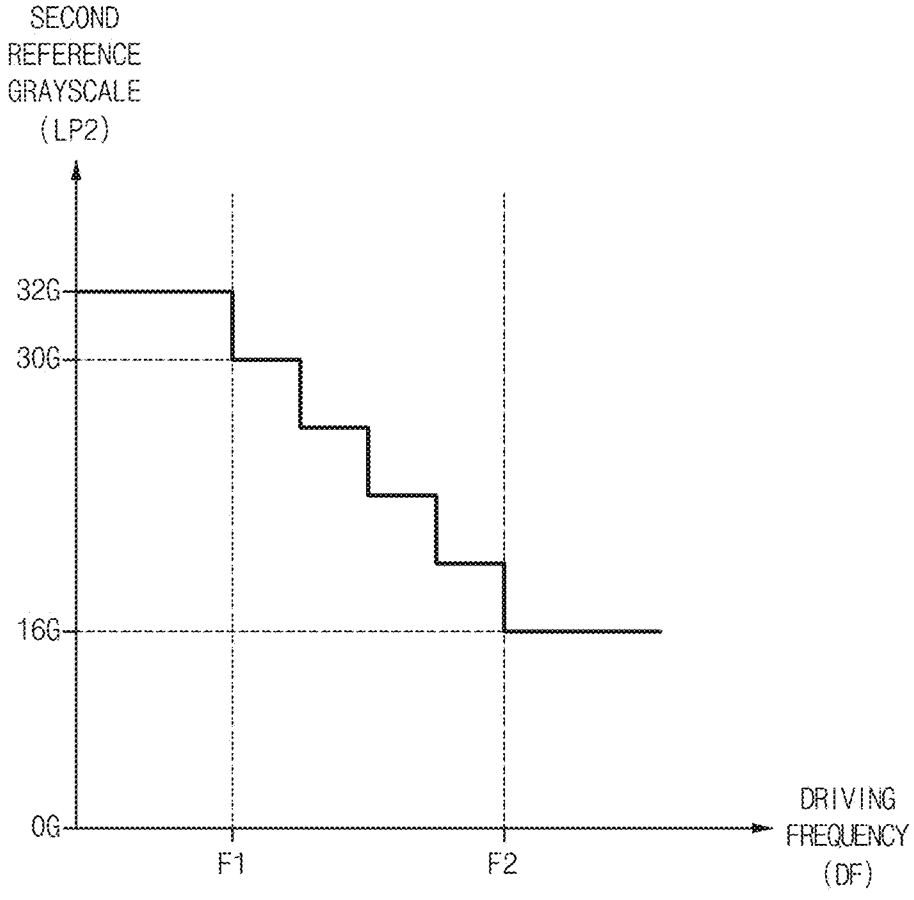
FIG. 7 is a graph illustrating a relationship between the driving frequency of the display panel of FIG. 1 and a second reference grayscale.

FIG. 6 is a graph illustrating a relationship between the driving frequency DF of the display panel 100 of FIG. 1 and the first reference grayscale LP1. FIG. 7 is a graph illustrating a relationship between the driving frequency DF of the display panel 100 of FIG. 1 and the second reference grayscale LP2.

Referring to FIGS. 1 to 7, when the driving frequency DF is changed, the first reference grayscale LP1 and the second reference grayscale LP2 of the low grayscale range may be changed. That is, when the driving frequency DF is changed, the low grayscale range may be changed.

According to some embodiments, when the driving frequency DF increases, the first reference grayscale LP1 of the low grayscale range may increase. When the driving frequency DF increases, the second reference grayscale LP2 of the low grayscale range may decrease. That is, the low grayscale range may become shorter as the driving frequency DF increases. For example, when the driving frequency DF is a first driving frequency F1, the first reference grayscale LP1 may be a grayscale value of 1 (1G), and the second reference grayscale LP2 may be a grayscale value of 30 (30G). The low grayscale range may be between the grayscale value of 1 (1G) and the grayscale value of 30 (30G).

According to some embodiments, when the driving frequency DF decreases, the first reference grayscale LP1 of the low grayscale range may decrease. The driving frequency DF decreases, the second reference grayscale LP2 of the low grayscale range may increase. That is, the low grayscale range may become longer as the driving frequency DF decreases. For example, when the driving frequency DF is a second driving frequency F2 which is higher than the first driving frequency F1, the first reference grayscale LP1 may be a grayscale value of 3 (3G), and the second reference grayscale LP2 may be the grayscale value of 16 (16G). The low grayscale range may be between the grayscale value of 3 (3G) and the grayscale value of 16 (16G).

According to some embodiments, when the driving frequency DF is higher than or equal to a maximum frequency, the first reference grayscale LP1 may be constant, but embodiments according to the present disclosure are not limited thereto. For example, when the driving frequency DF is higher than or equal to the second frequency F2, the first reference grayscale LP1 may be constant as the grayscale value of 3 (3G).

According to some embodiments, when the driving frequency DF is higher than or equal to the maximum frequency, the second reference grayscale LP2 may be constant, but embodiments according to the present disclosure are not limited thereto. For example, when the driving frequency DF is higher than or equal to the second frequency F2, the second reference grayscale LP2 may be constant as the grayscale value of 16 (16G).

According to some embodiments, the driving frequency DF is lower than or equal to a minimum frequency, the second reference grayscale LP2 may be constant, but embodiments according to the present disclosure are not limited thereto. For example, when the driving frequency DF is lower than or equal to the first frequency F1, the second reference grayscale LP2 may be constant as the grayscale value of 32 (32G).

In the low grayscale range, when the driving frequency DF increases, the charging ratio of the storage capacitor CST may increase as the low grayscale range determiner 220 increases the first reference grayscale LP1 and decreases the second reference grayscale LP2. Accordingly, the first reference grayscale LP1 and the second reference grayscale LP2 may be exactly displayed in the display panel 100. In addition, the mura may not be visible in the low grayscale range. That is, a quality of the display device 1 may be relatively improved.

Figure 8:
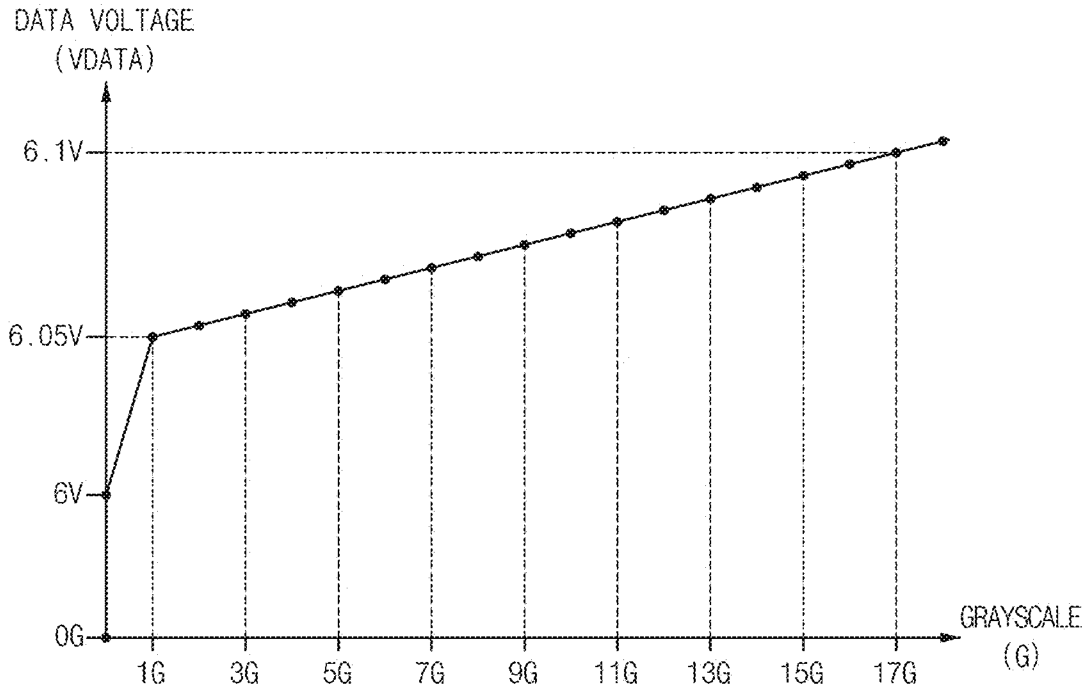
FIG. 8 is a graph illustrating a relationship between a grayscale of input image data applied to the driving controller of FIG. 1 and a data voltage output from a data driver of FIG. 1.

FIG. 8 is a graph illustrating a relationship between a grayscale G of the input image data IMG applied to the driving controller 200 of FIG. 1 and the data voltage VDATA output from the data driver 500 of FIG. 1.

Referring to FIGS. 1 to 8, when the driving frequency DF is a high frequency, the low grayscale range may be shortened, and the charging ratio of the storage capacitor CST may become higher.

According to some embodiments, when the driving frequency DF is the high frequency, the charging time CT may be from a first time t1 to a second time t2. The data voltage DATA corresponding to the grayscale value of 0 (0G) may be 6V. The data voltage DATA corresponding to the grayscale value of 1 (1G) may be 6.05V. The data voltage DATA corresponding a grayscale value of 17 (17G) may be 6.1V.

When the low grayscale range is from the grayscale value of 0 (0G) to the grayscale value of 17 (17G), a difference between the data voltages VDATA may be 0.1V. The storage capacitor CST may start storing the data voltage VDATA from 6V. The storage capacitor CST may not store the data voltage VDATA up to 6.1V during the charging time CT. That is, the data voltage VDATA corresponding to the grayscale of 17 (17G) may not be stored to the storage capacitor CST. The grayscale value of 17 (17G) may not be exactly displayed. The grayscale value of 17 (17G) is not exactly displayed, so that the grayscales G of the low grayscale range may not be displayed using the grayscale value of 0 (0G) and the grayscale value of 17 (17G). That is, the mura may be visible in the low grayscale range.

On the other hand, when the low grayscale range is from the grayscale value of 1 (1G) to the grayscale value of 17 (17G), a difference between the data voltages VDATA may be 0.05V. The storage capacitor CST may start storing the data voltage VDATA from 6.05V. The storage capacitor CST may store the data voltage VDATA up to 6.1V during the charging time CT. The grayscale value of 17 (17G) may be exactly displayed. The grayscale value of 17 (17G) and the grayscale value of 1 (1G) are exactly displayed, so that the grayscales G of the low grayscale range may be exactly displayed. That is, the mura may not be visible.

The charging ratio of the storage capacitor CST may increase during the charging time CT as the low grayscale range becomes shorter. The charging ratio increases, so that the first reference grayscale LP1 and the second reference grayscale LP2 of the low grayscale range may be exactly displayed. Accordingly, the grayscales G of the low grayscale range may be exactly displayed in the display panel 100. That is, the mura may not be visible in the low grayscale range. The quality of the display device may be relatively improved.

Figure 9:
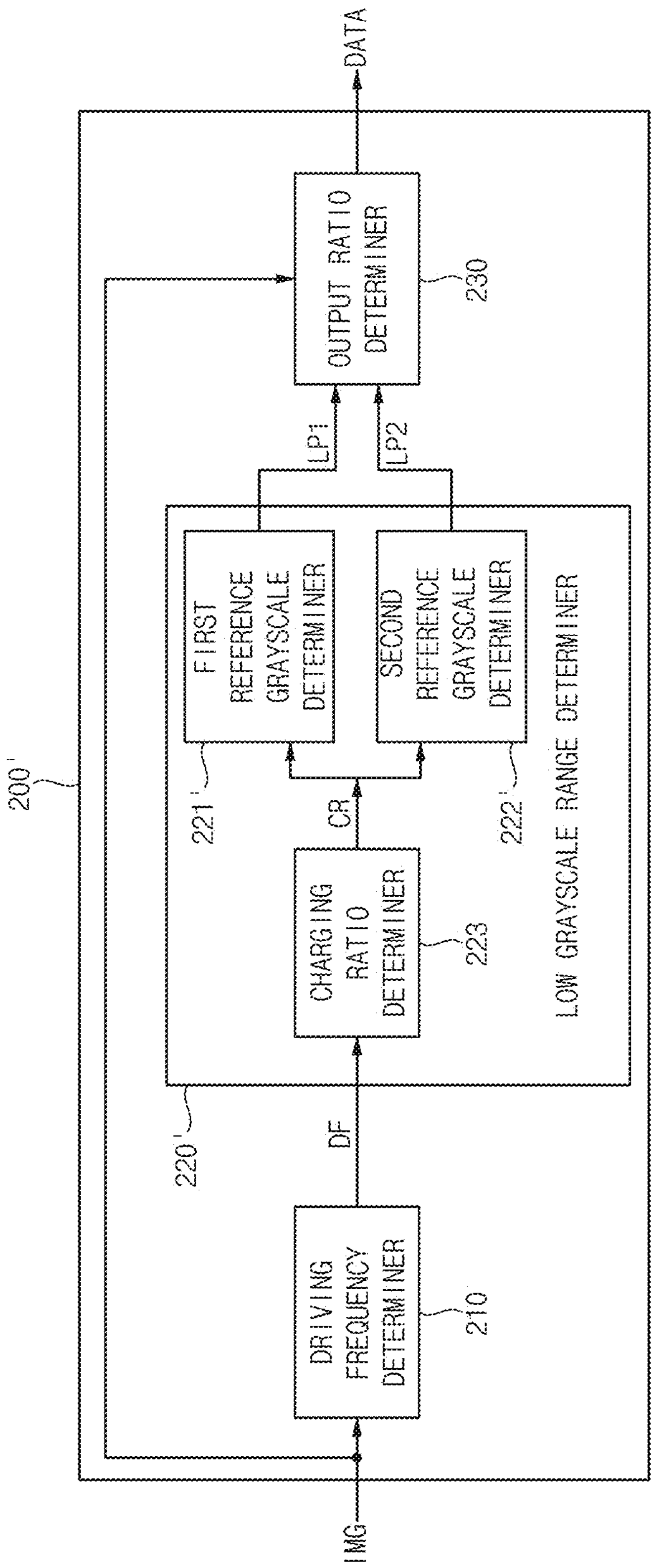
FIG. 9 is a block diagram illustrating a low grayscale range determiner of a driving controller of a display device according to some embodiments of the present disclosure.

FIG. 9 is a block diagram illustrating a low grayscale range determiner (or a low grayscale range determination circuit) 220' of a driving controller 200' of the display device 1 according to some embodiments of the present disclosure.

The display device 1 according to the present disclosure are the same or substantially the same as the display device 1 of FIGS. 1 to 8 except that the low grayscale range determiner 220' further includes a charging ratio determiner (or a charging ratio determination circuit) 223. Thus, the same reference numerals will be used to refer to the same or like parts as those described in the previous embodiments of FIGS. 1 to 8 and some repetitive explanation concerning the above elements may be omitted.

Referring to FIGS. 1 to 9, the low grayscale range determiner 220' may include the charging ratio determiner 223, a first reference grayscale determiner 221' and a second reference grayscale determiner 222'.

The low grayscale range determiner 220' may determine the low grayscale range in which the minimum grayscale is the first reference grayscale LP1 and the maximum grayscale is the second reference grayscale LP2.

The charging ratio determiner 223 may determine the charging ratio CR based on the driving frequency DF. For example, the charging ratio determiner 223 may determine the charging ratio CR corresponding to the driving frequency DF based on a third look-up table. The charging ratio CR may decrease as the driving frequency DF increases.

The first reference grayscale determiner 221' may determine the first reference grayscale LP1 based on the charging ratio CR. For example, the first reference grayscale determiner 221' may determine the first reference grayscale LP1 corresponding to the charging ratio CR based on a fourth look-up table.

The second reference grayscale determiner 222' may determine the second reference grayscale LP2 based on the charging ratio CR. For example, the second reference grayscale determiner 222' may determine the second reference grayscale LP2 corresponding to the charging ratio CR based on a fifth look-up table.

The first reference grayscale LP1 and the second reference grayscale LP2 may be changed according to the charging ratio CR. For example, when the charging ratio CR decreases, the first reference grayscale LP1 may increase and the second reference grayscale LP2 may be the constant value. For example, when the charging ratio CR decreases, the second reference grayscale LP2 may decrease and the first reference grayscale LP1 may be the constant value. For example, when the charging ratio CR decreases, the first reference grayscale LP1 may increase and the second reference grayscale LP2 may decrease.

In the low grayscale range, when the driving frequency DF becomes higher, the charging time CT may be shortened. The charging time CT is shortened, so that the charging ratio CR may become lower. The charging ratio CR becomes lower when the charging time CT is shortened, so that the low grayscale range determiner 220' may increase the first reference grayscale LP1 and may decrease the second reference grayscale LP2. The first reference grayscale LP1 is increased and the second reference grayscale LP2 is decreased, so that a swing width of the data voltage VDATA may decrease. The swing width of the data voltage VDATA decreases when the charging time CT is shortened, so that the charging ratio CR of the storage capacitor CST may increase again. Accordingly, the first reference grayscale LP1 and the second reference grayscale LP2 may be exactly displayed in the display panel 100. In addition, the mura may not be visible in the low grayscale range. That is, a quality of the display device 1 may be relatively improved.

Figure 10:
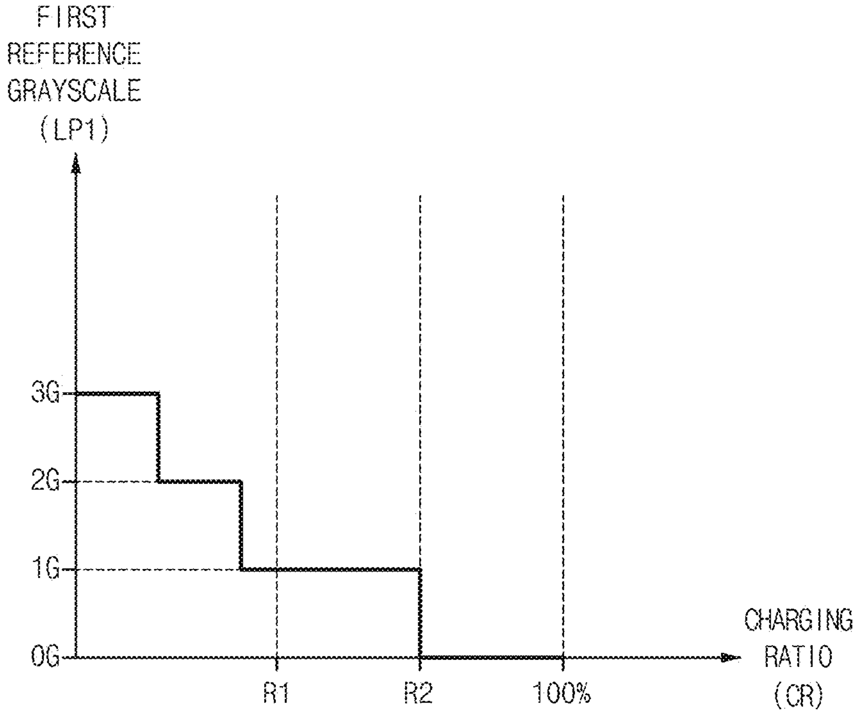
FIG. 10 is a graph illustrating a relationship between a charging ratio determined by a charging ratio determiner of FIG. 9 and the first reference grayscale.
Figure 11:
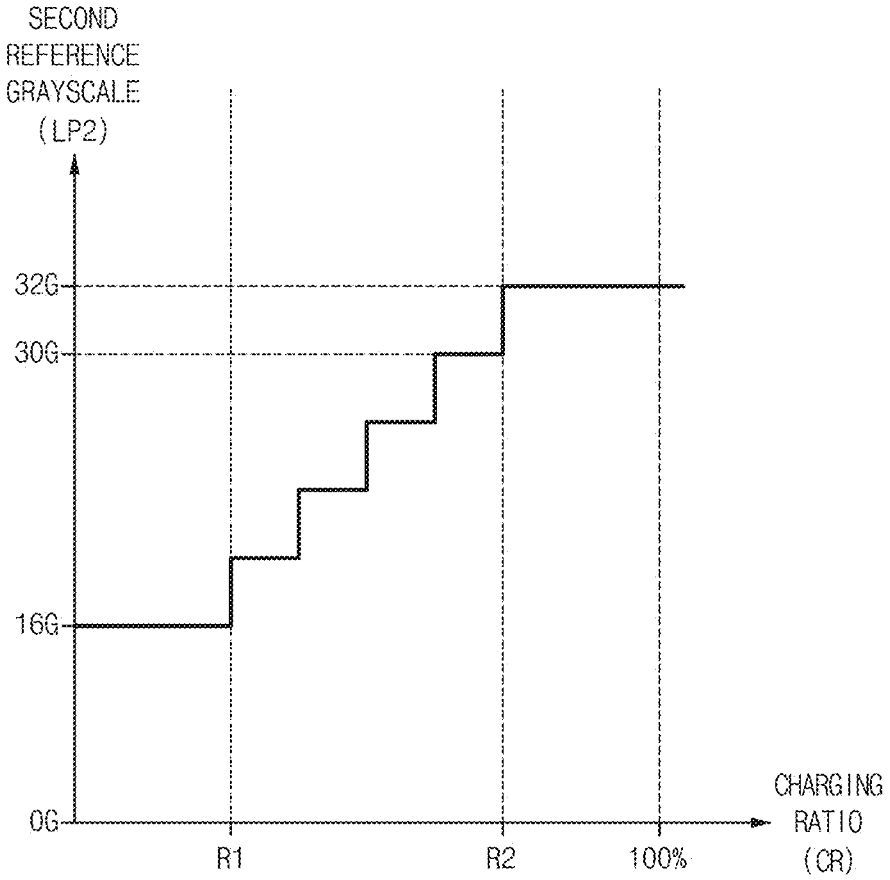
FIG. 11 is a graph illustrating a relationship between the charging ratio determined by the charging ratio determiner of FIG. 9 and the second reference grayscale.

FIG. 10 is a graph illustrating a relationship between the charging ratio CR determined by a charging ratio determiner 223 of FIG. 9 and the first reference grayscale LP1. FIG. 11 is a graph illustrating a relationship between the charging ratio CR determined by the charging ratio determiner 223 of FIG. 9 and the second reference grayscale LP2.

Referring to FIGS. 1 to 4 and 9 to 11, when the driving frequency DF is changed, the charging ratio CR may be changed. When the charging ratio CR is changed, the first reference grayscale LP1 and the second reference grayscale LP2 of the low grayscale range may be changed. That is, when the charging ratio CR is changed, the low grayscale range may be changed.

According to some embodiments, when the charging ratio CR decreases, the first reference grayscale LP1 of the low grayscale range may increase. The charging ratio CR decreases, the second reference grayscale LP2 of the low grayscale range may decrease. That is, the low grayscale range may become shorter as the charging ratio CR decreases. For example, when the charging ratio CR is a first charging ratio R1, the first reference grayscale LP1 may be the grayscale value of 1 (1G), and the second reference grayscale LP2 may be the grayscale value of 16 (16G). The low grayscale range may be between the grayscale value of 1 (1G) and the grayscale value of 16 (16G).

According to some embodiments, when the charging ratio CR increases, the first reference grayscale LP1 of the low grayscale range may decrease. The charging ratio CR increases, the second reference grayscale LP2 of the low grayscale range may increase. That is, the low grayscale range may become longer as the charging ratio CR increase. For example, when the charging ratio CR is a second charging ratio R2 higher than the first charging ratio R1, the first reference grayscale LP1 may be the grayscale value of 0 (0G), and the second reference grayscale LP2 may be the grayscale value of 32 (32G). The low grayscale range may be between the grayscale value of 0 (0G) to the grayscale value of 32 (32G).

According to some embodiments, when the charging ratio CR is lower than or equal to a minimum charging ratio, the first reference grayscale LP1 may be constant, but embodiments according to the present disclosure are not limited thereto. For example, when the charging ratio CR is lower than or equal to the minimum charging ratio, the first reference grayscale LP1 may be constant as the grayscale value of 3 (3G).

According to some embodiments, when the charging ratio CR is higher than or equal to a maximum charging ratio, the second reference grayscale LP2 may be constant, but embodiments according to the present disclosure are not limited thereto. For example, when the charging ratio CR is higher than or equal to the second charging ratio R2, the second reference grayscale LP2 may be constant as the grayscale value of 32 (32G).

According to some embodiments, when the charging ratio CR is lower than or equal to a minimum charging ratio, the second reference grayscale LP2 may be constant, but embodiments according to the present disclosure are not limited thereto. For example, when the charging ratio CR is lower than or equal to the first charging ratio R1, the second reference grayscale LP2 may be constant as the grayscale value of 16 (16G).

In the low grayscale range, when the driving frequency DF becomes higher, the charging time CT may be shortened. The charging time CT is shortened, so that the charging ratio CR may become lower. The charging ratio CR becomes lower when the charging time CT is shortened, so that the low grayscale range determiner 220' may increase the first reference grayscale LP1 and may decrease the second reference grayscale LP2. The first reference grayscale LP1 is increased and the second reference grayscale LP2 is decreased, so that a swing width of the data voltage VDATA may decrease. The swing width of the data voltage VDATA decreases when the charging time CT is shortened, so that the charging ratio CR of the storage capacitor CST may increase again. Accordingly, the first reference grayscale LP1 and the second reference grayscale LP2 may be exactly displayed in the display panel 100. In addition, the mura may not be visible in the low grayscale range. That is, a quality of the display device 1 may be relatively improved.

Figure 12:
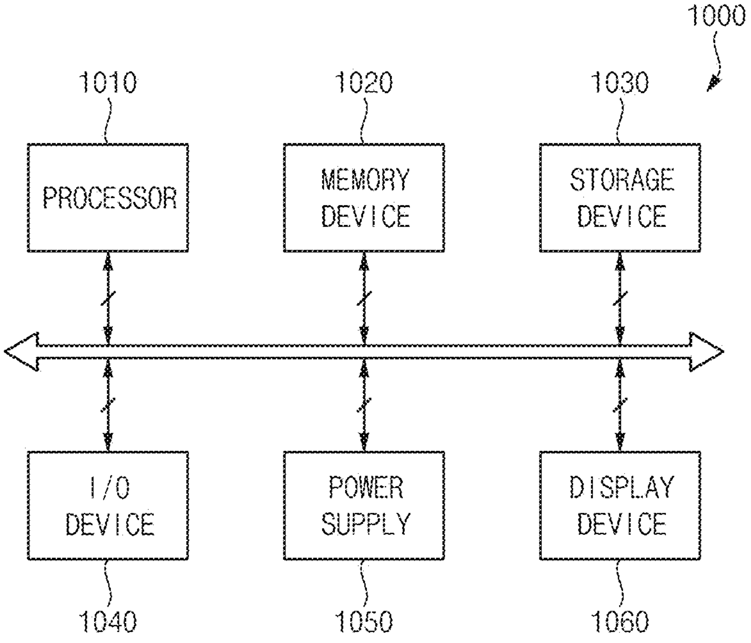
FIG. 12 is a block diagram illustrating an electronic device according to some embodiments of the present disclosure.
Figure 13:
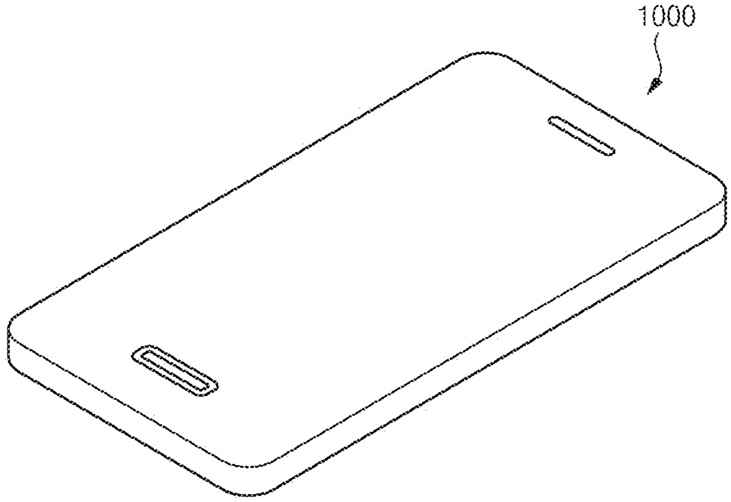
FIG. 13 is a diagram illustrating the electronic device of FIG. 12 implemented as a smart phone.

FIG. 12 is a block diagram illustrating an electronic device 1000 according to some embodiments of the present disclosure. FIG. 13 is a diagram illustrating the electronic device 1000 of FIG. 12 implemented as a smart phone.

Referring to FIGS. 12 and 13, the electronic device 1000 may include a processor 1010, a memory device 1020, a storage device 1030, an input/output (I/O) device 1040, a power supply 1050 and a display device 1060. At this time, the display device 1060 may be the display device 1 of FIG. 1. In addition, the electronic device 1000 may further include ports for communicating with a video card, a sound card, a memory card, a universal serial bus (USB) device, other electronic device, and the like.

According to some embodiments, as illustrated in FIG. 13, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

According to some embodiments, the processor 1010 may output the input image data IMG and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a touch-pad, a touch-screen, a mouse device, and the like, and an output device such as a speaker, a printer, and the like. In some embodiments, the I/O device 1040 may include the display device 1060.

The power supply 1050 may provide power for operations of the electronic device 1000.

The display device 1060 may be connected to other components through buses or other communication links.

Aspects of embodiments according to the present disclosure may be applied to any display device and any electronic device including the display device. For example, aspects of embodiments according to the present disclosure may be applied to a television (TV), a digital TV, a 3D TV, a mobile phone, a smart phone, a tablet computer, a laptop computer, a personal computer (PC), a household electronic device, a personal digital assistant (PDA), a portable multimedia player (PMP), a digital camera, a music player, a portable game console, a navigation device, etc.

The foregoing is illustrative of aspects of embodiments according to the present disclosure and is not to be construed as limiting thereof. Although aspects of some embodiments of the present disclosure have been described, those skilled in the art will readily appreciate that many modifications are possible in the embodiments without materially departing from the novel teachings and characteristics of embodiments according to the present disclosure. Accordingly, all such modifications are intended to be included within the scope of embodiments according to the present disclosure as defined in the appended claims, and their equivalents. In the claims, means-plus-function clauses are intended to cover the structures described herein as performing the recited function and not only structural equivalents but also equivalent structures. Therefore, it is to be understood that the foregoing is illustrative of embodiments according to the present disclosure and is not to be construed as limited to the specific embodiments disclosed, and that modifications to the disclosed embodiments, as well as other embodiments, are intended to be included within the scope of the appended claims. Aspects of some embodiments are defined by the following claims, with equivalents of the claims to be included therein.

What is claimed is:

1. A display device comprising:

a display panel including a plurality of pixels;

a driving controller configured to generate output image data based on input image data; and a data driver configured to generate a data voltage based on the output image data, wherein the driving controller is configured to:

determine a low grayscale range in which a minimum grayscale is a first reference grayscale and a maximum grayscale is a second reference grayscale based on a driving frequency; and determine an output ratio and an output order of first reference output image data corresponding to the first reference grayscale and second reference output image data corresponding to the second reference grayscale.

2. The display device of claim 1, wherein the first reference grayscale is configured to be changed based on the driving frequency being changed.

3. The display device of claim 2, wherein the first reference grayscale is configured to increase based on the driving frequency increasing.

4. The display device of claim 1, wherein the second reference grayscale is configured to be changed based on the driving frequency being changed.

5. The display device of claim 4, wherein the second reference grayscale is configured to decrease based on the driving frequency increasing.

6. The display device of claim 1, wherein the first reference grayscale is configured to be changed and the second reference grayscale is configured to be changed based on the driving frequency being changed.

7. The display device of claim 6, wherein the first reference grayscale is configured to increase and the second reference grayscale is configured to decrease based on the driving frequency increasing.

8. The display device of claim 1, wherein the driving controller is configured to determine a charging time at which the data voltage is charged to the pixels based on the driving frequency, and determine a charging ratio at which the data voltage is charged to the pixels based on the charging time.

9. The display device of claim 8, wherein the first reference grayscale is configured to decrease and the second reference grayscale is configured to increase based on the charging ratio increasing.

10. A display device comprising:

a display panel including a plurality of pixels;

a driving controller configured to generate output image data based on input image data; and a data driver configured to generate a data voltage based on the output image data, wherein the driving controller includes:

a driving frequency determiner configured to determine a driving frequency of the display panel;

a low grayscale range determiner configured to determine a first reference grayscale based on the driving frequency, determine a second reference grayscale based on the driving frequency, and determine a low grayscale range in which a minimum grayscale is the first reference grayscale and a maximum grayscale is the second reference grayscale; and an output ratio determiner configured to determine an output ratio and an output order of first reference output image data corresponding to the first reference grayscale and second reference output image data corresponding to the second reference grayscale.

11. The display device of claim 10, wherein the low grayscale range determiner includes a first reference grayscale determiner configured to change the first reference grayscale based on the driving frequency being changed.

12. The display device of claim 11, wherein the first reference grayscale is configured to increase based on the driving frequency increasing.

13. The display device of claim 10, wherein the low grayscale range determiner includes a second reference grayscale determiner configured to change the second reference grayscale based on the driving frequency being changed.

14. The display device of claim 13, wherein the second reference grayscale is configured to decrease based on the driving frequency increasing.

15. The display device of claim 10, wherein the low grayscale range determiner includes:

a first reference grayscale determiner configured to change the first reference grayscale based on the driving frequency being changed; and a second reference grayscale determiner configured to change the second reference grayscale based on the driving frequency being changed.

16. The display device of claim 15, wherein the first reference grayscale is configured to increase and the second reference grayscale is configured to decrease based on the driving frequency increasing.

17. The display device of claim 10, wherein the low grayscale range determiner includes a charging ratio determiner configured to determine a charging ratio at which the data voltage is charged to the pixels, and wherein the charging ratio determiner is configured to:

determine a charging time at which the data voltage is charged to the pixels based on the driving frequency, and determine the charging ratio based on the charging time.

18. The display device of claim 17, wherein the first reference grayscale is configured to decrease and the second reference grayscale is configured to increase based on the charging ratio increasing.

19. An electronic device comprising:

a processor configured to output input image data;

a memory device configured to store data required for an operation of the processor;

a display panel including a plurality of pixels;

a driving controller configured to generate output image data based on the input image data; and a data driver configured to generate a data voltage based on the output image data, wherein the driving controller is configured to:

determine a low grayscale range in which a minimum grayscale is a first reference grayscale and a maximum grayscale is a second reference grayscale based on a driving frequency; and determine an output ratio and an output order of first reference output image data corresponding to the first reference grayscale and second reference output image data corresponding to the second reference grayscale.

20. The electronic device of claim 19, wherein the first reference grayscale is configured to be changed and the second reference grayscale is configured to be changed based on the driving frequency being changed.

* * * * *